(12) United States Patent
Beverung et al.

(10) Patent No.: US 8,981,959 B2
(45) Date of Patent: Mar. 17, 2015

(54) APPARATUS AND METHOD FOR PRIORITY ADDRESSING AND MESSAGE HANDLING IN A FIXED METER READING NETWORK

(75) Inventors: Ryan M. Beverung, Austin, TX (US); Kelly Laughlin-Parker, Waukesha, WI (US); John A. Olson, Brookfield, WI (US); Mark Lazar, New Berlin, WI (US); Christopher D. Hielsberg, Watertown, WI (US)

(73) Assignee: Badger Meter, Inc., Milwaukee, WI (US)

( * ) Notice: Subject to any disclaimer, the term of this patent is extended or adjusted under 35 U.S.C. 154(b) by 1120 days.

(21) Appl. No.: 12/976,308

(22) Filed: Dec. 22, 2010

(65) Prior Publication Data

US 2011/0298634 A1 Dec. 8, 2011

Related U.S. Application Data

(63) Continuation-in-part of application No. 12/792,128, filed on Jun. 2, 2010, now Pat. No. 8,471,723.

(51) Int. Cl.
*G08C 15/06* (2006.01)
*H04Q 9/00* (2006.01)

(52) U.S. Cl.
CPC ............ *H04Q 9/00* (2013.01); *H04Q 2209/60* (2013.01)
USPC ............... 340/870.02; 340/870.2; 340/870.28

(58) Field of Classification Search
CPC ..... H04Q 2209/60; H04Q 9/00; G01D 4/004; Y02B 90/242; Y02B 90/243; Y02B 90/246; Y04S 20/322; Y04S 20/325; Y04S 20/42
USPC ................ 340/870.6, 870.11, 870.3, 870.28, 340/870.43, 870.2
See application file for complete search history.

(56) References Cited

U.S. PATENT DOCUMENTS

| | | | |
|---|---|---|---|
| 4,868,566 A | 9/1989 | Strobel et al. | |
| 5,298,894 A | 3/1994 | Cerny et al. | |
| 5,825,303 A | 10/1998 | Bloss, Jr. et al. | |
| 7,304,587 B2 * | 12/2007 | Boaz | 340/870.02 |
| 2009/0216878 A1 | 8/2009 | Saadeh | |
| 2010/0073193 A1 * | 3/2010 | Flammer, III | 340/870.11 |
| 2010/0265096 A1 * | 10/2010 | Cornwall et al. | 340/870.02 |

* cited by examiner

*Primary Examiner* — Brian Zimmerman
*Assistant Examiner* — Bhavin M Patel
(74) *Attorney, Agent, or Firm* — Boyle Fredrickson, S.C.

(57) ABSTRACT

A method and apparatus is disclosed for prioritizing the processing of messages sent between site transceivers (12, 15) at utility meter data origination sites (10) and gateway transceivers (20, 30, 40) in a fixed meter data collection network. To reduce message processing time, priorities are assigned for processing messages destined for mobile gateways, messages sent to assigned gateways, and messages sent to any gateway after not receiving an acknowledge signal from an assigned gateway. The gateway transceiver also has four receivers for processing four respective messages on four different frequency channels to further reduce processing time and to conserve power usage at the site transceivers.

8 Claims, 5 Drawing Sheets

APPARATUS AND METHOD FOR PRIORITY ADDRESSING AND MESSAGE HANDLING IN A FIXED METER READING NETWORK

CROSS-REFERENCE TO RELATED APPLICATION

This is a continuation-in-part of U.S. patent application Ser. No. 12/792,128, filed Jun. 2, 2010 now U.S. Pat. No. 8,471,723, and the benefit of its earlier filing date is claimed herein for the commonly disclosed subject matter.

TECHNICAL FIELD

This invention relates to automatic meter reading systems and, in particular, to utility meters using methods and apparatus for transmitting metering data signals to a fixed network receiver in a radio frequency wireless network for collecting utility metering data.

DESCRIPTION OF THE BACKGROUND ART

A typical fixed network automatic meter reading system comprises utility meter data origination sites, repeaters, gateways, and a backhaul network. The utility meter data origination sites include radio frequency transmitters or transceivers located at a utility meter, which is contemplated as a water meter or a gas meter. The transmitters or transceivers communicate with receivers via a wireless radio frequency communication link. If these receivers communicate with a large number of utility meter data origination sites (hereafter sometimes referred to simply as "sites") either directly or through relay devices known as repeaters, and also interface to a backhaul network, they are known as gateways. Gateways collect the data from a plurality of utility meter data origination sites and pass the information through a wired or wireless network (local or wide area network), sometimes called a "backhaul network," to a central data collection system, where the data is processed for billing purposes. This backhaul network may include various public or private systems such as the WIFI (a wireless LAN), GPRS (a second generation cellular network), POE (Power over Internet), or CDMA (code division multiple access) or others known in the art.

These systems. both mobile and fixed, have been known in the art as AMR systems or "Automatic Meter Reading Systems." More recently, the term "AMI" or "Advanced Metering Infrastructure" has been used to describe fixed network systems having some two-way communication abilities.

The description herein relates to the installation and operational start-up of transmitters/transceivers at the sites of specific utility meters (referred to as site transceivers). The meter reading devices which include the site transceivers transmit messages to the gateway and receive return messages from the gateway. As disclosed in U.S. patent application Ser. No. 12/792,128, the meter reading device, after assignment to a gateway, will transmit messages with the gateway address. If the message is not received after two tries, the message is sent with a generic gateway address to be received by any gateway. This generic address is also used for the system initialization phase or discovery phase before the site transceiver has been assigned to a specific gateway.

The site transceivers operate on battery power. Therefore, it is advantageous to shut them off, or return to a low power state, when not communicating with a gateway.

The system must be adaptable to allow a large number of remote sites to communicate through gateways to a network data reader at a data collection center.

SUMMARY OF THE INVENTION

To improve the operation of the gateways, they are provided with a priority addressing and message handling ability. The gateways prioritize the messages from the meter reading devices to reduce the time for processing the data in the messages.

Upon receiving a message, the gateway first tests the message for an address of a mobile gateway in the appropriate portion of the message. The mobile destination address is used for any transmission intended for reception by a walk-by or drive-by transceiver. Because the gateways are looking for messages addressed to a fixed gateway, any message that is intended a mobile gateway will not be processed further and the communication cycle will end.

Next, if no mobile message is detected, the gateway will check for a message from a site transceiver that was assigned to the gateway during start up operations. If such a message is detected, the data in the message will be stored and saved, and a reply message will be formed and transmitted in to the site transceiver.

Next, if neither of these messages is detected, the gateway tests for a generic gateway address such as "FFFFFFFF." This could be received on start up, before the site transceiver has been assigned, or this could be received after a gateway has been assigned, and when a message is received from this site transceiver, or another site transceiver, after some failed attempts to communicate with an assigned gateway. If the meter reading device has been assigned to the gateway, data in the message will be stored and saved, and a reply message will be formed and transmitted in to the meter reading device. If the meter reading device has not been assigned to the gateway, the data in the message will be stored and saved to record receipt of the message, but a reply message will not be transmitted.

The invention also relates to a method of communications between a gateway fixed transceiver and a plurality of transceivers located at respective utility meter data origination sites, the method comprising: the plurality of transceivers transmitting on various ones of at least twenty-five frequency hopping channels; receiving and processing messages through four receiver circuits in the gateway fixed receiver, and routing incoming transmissions to four receiver circuits such that receptions on the at least twenty-five the frequency hopping channels are divided in four groups or subsets of the total number of frequency channels among the four receiver circuits.

As a further feature, the gateway transceiver has four receivers for scanning from twenty-five up to fifty (50) channels in a spread spectrum frequency hopping mode of communication. Messages on the channels are routed to four receivers to process four messages concurrently from four respective channels.

The invention further provides a gateway transceiver circuit for use in an automatic meter reading network, the gateway transceiver circuit comprising a circuit for carrying out the method of the invention as described above by executing a program of program instructions. The invention further provides a site transceiver circuit for sending the messages with the gateway addresses discussed above.

The invention is particularly applicable to circuitry associated with water meters and gas meters including transmitters that operate on battery power.

This invention allows for extension of battery life in the site transceivers, enables optimal use of radio frequency channels and enables an increase in volume of utility metering data collection for a defined geographical area.

Other features of the invention, besides those discussed above, will be apparent to those of ordinary skill in the art from the description of the preferred embodiments which follows. In the description, reference is made to the accompanying drawings, which form a part hereof, and which illustrate examples of the invention. Such examples are illustrative, and for the scope of the invention, reference is made to the claims which follow the description.

DETAILED DESCRIPTION

Figure 1:
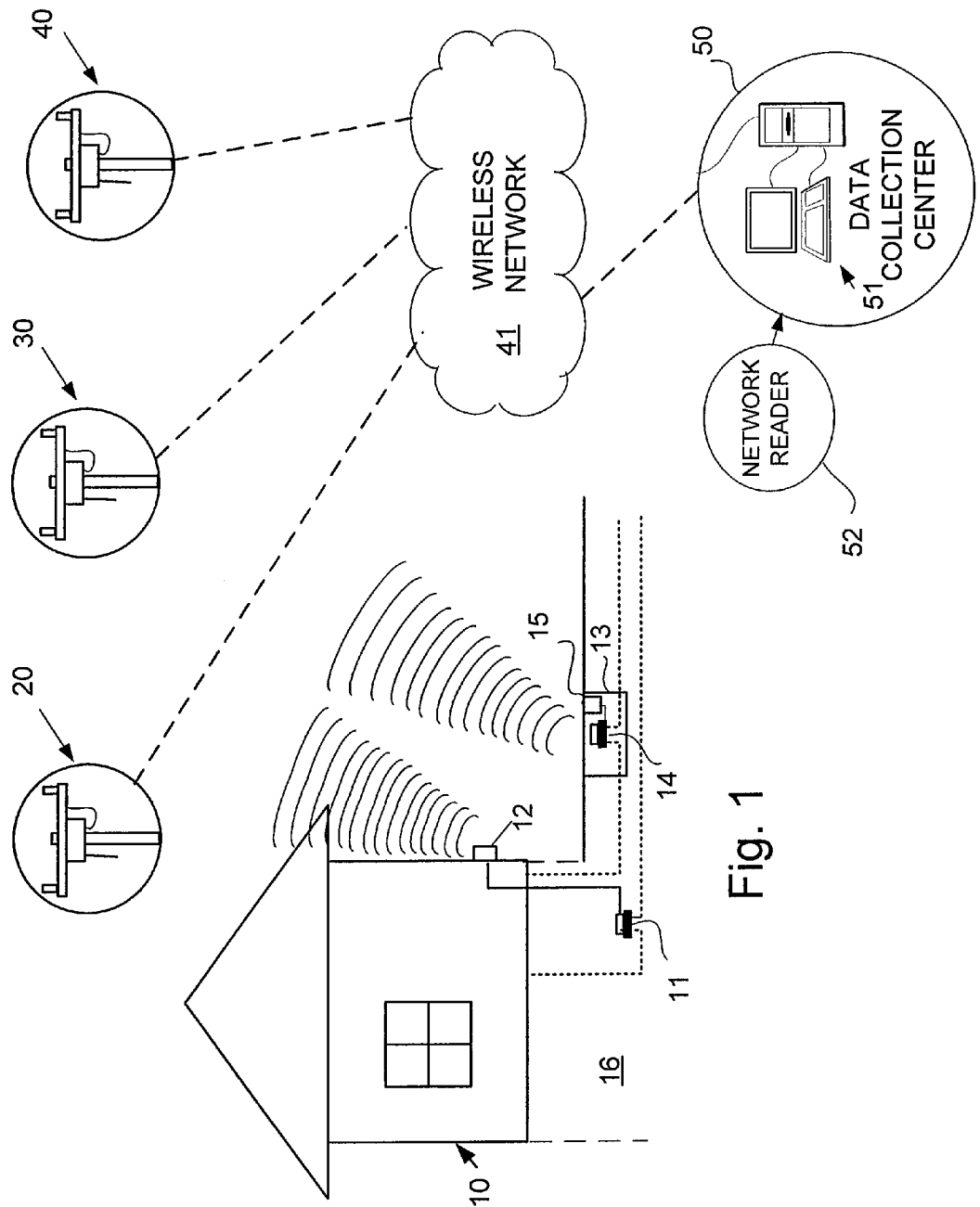
FIG. 1 is a schematic view of a system for transmitting meter data from utility meter data origination points to a data collection center via multiple gateways.

Referring to FIG. 1, a fixed automatic meter reading system includes a meter and meter register assembly 11 connected in a water line (shown schematically as a dashed line in FIG. 1) serving a residential building 10 through a basement 16 or a foundation crawl space. For buildings built on a concrete slab foundation, entry can be made through the slab or through a side wall. The assembly 11 includes a meter register for transmitting pulses to a site transceiver assembly 12 mounted somewhere within or on the building 10. Alternatively, a meter and meter register assembly 14 can be connected in a water line (shown schematically as a dashed line in FIG. 1) and disposed in a subsurface pit enclosure 13 adjacent the building 10. The meter assemblies 11, 14 each include a register for transmitting pulses to a site transceiver assembly 15 mounted to a pit lid, for example as further disclosed in Cerny et al., U.S. Pat. No. 5,298,894 and Bloss Jr. et al., U.S. Pat. No. 5,825,303 and other known well known prior art.

Although the preferred embodiment is disclosed in the context of water meters, this disclosure is also applicable to gas meters either inside or outside of a building.

The meter register in the assembly 11, 14 can be a unit that is commercially distributed by Badger Meter, Inc., the assignee of the present invention, under the trade designation "Recordall" Transmitter Register (RTR). Besides displaying units of consumption, this device uses a pulse transmitter that is described in Strobel et al., U.S. Pat. No. 4,868,566, entitled "Flexible Piezoelectric Switch Activated Metering Pulse Generators," to convert the mechanical movements of the meter to electrical signals. Other metering transducers known in the art, such as the absolute digital encoder (ADE) circuit offered by the assignee of the present invention can also be used as the meter register.

Typically, the site transceiver assemblies 12, 15 are not connected to a source of AC or DC power and are operated on battery power. The site transceiver assemblies 12, 15 communicate with network transceiver assemblies 20, 30, 40 via a wireless radio frequency communication link. The meter data collection network is a fixed network, which is characterized by fixed network transceiver assemblies 20, 30, 40 as opposed to mobile transceivers carried in a vehicle or carried by a human employed to collect meter data. The transceiver assemblies 20, 30, 40 can communicate with the site transceiver assemblies 12, 15, either directly, or through intermediate fixed transceiver assemblies known as repeaters. The repeaters receive messages from the site transceiver assemblies 12, 15 and relay the data in further radio frequency messages to the gateway transceiver assemblies 20, 30, 40 Or, the repeaters can communicate in an opposite direction by receiving radio frequency messages from the gateway transceiver assemblies 20, 30, 40 and relaying the data content in further radio frequency messages to the site transceiver assemblies, 12, 15.

If these transceiver assemblies 20, 30, 40 communicate with a backhaul network, such as network 41, they are known as gateways (to the network). These transceiver units or gateways 20, 30, 40 can be mounted on utility poles, streetlight poles, or on other high structures such as buildings or water storage tank towers, or can be placed inside of electric meters or in utility pedestals. Gateways typically have a source of AC power, which can be converted to DC power for operating circuitry in the gateway. Gateways collect the data that is received from a plurality of transceivers 12, 15 at the utility meter data origination sites and pass the data via a second network, sometimes called a backhaul network to a central data collection center 50 in FIG. 1. In this example, the backhaul network is a wireless network 41. This wireless network 41 can include various public or private wireless systems operating according to at least one of the following protocols; WIFI (a wireless local area network connected to the Internet), GPRS (a second generation cellular network), POE (Power over Ethernet to the Internet) or CDMA (code division multiple access) and others known in the art.

The site transceiver assemblies 12, 15 transmit an electronic message that generally includes an identification (ID) code for the site transceiver and its associated meter reading device, a gateway destination address, current meter reading data, historical consumption data, status information, and an error code for checking the data at the receiving end. The meter data is eventually collected at the data collection center 50 for billing purposes. This data collection center 50 includes one or more computers 51 for communicating with the backhaul network 40 and processing the utility metering data into customer billing statements. The data collection center 50 also includes a network reader computer program 52 that is executed on a computer 51 for managing communications with the meter data collection network. This computer program is further described in U.S. Pat. Pub. No. US2009/0216878, published Aug. 27, 2009, and assigned to the assignee of the present invention.

Figure 2:
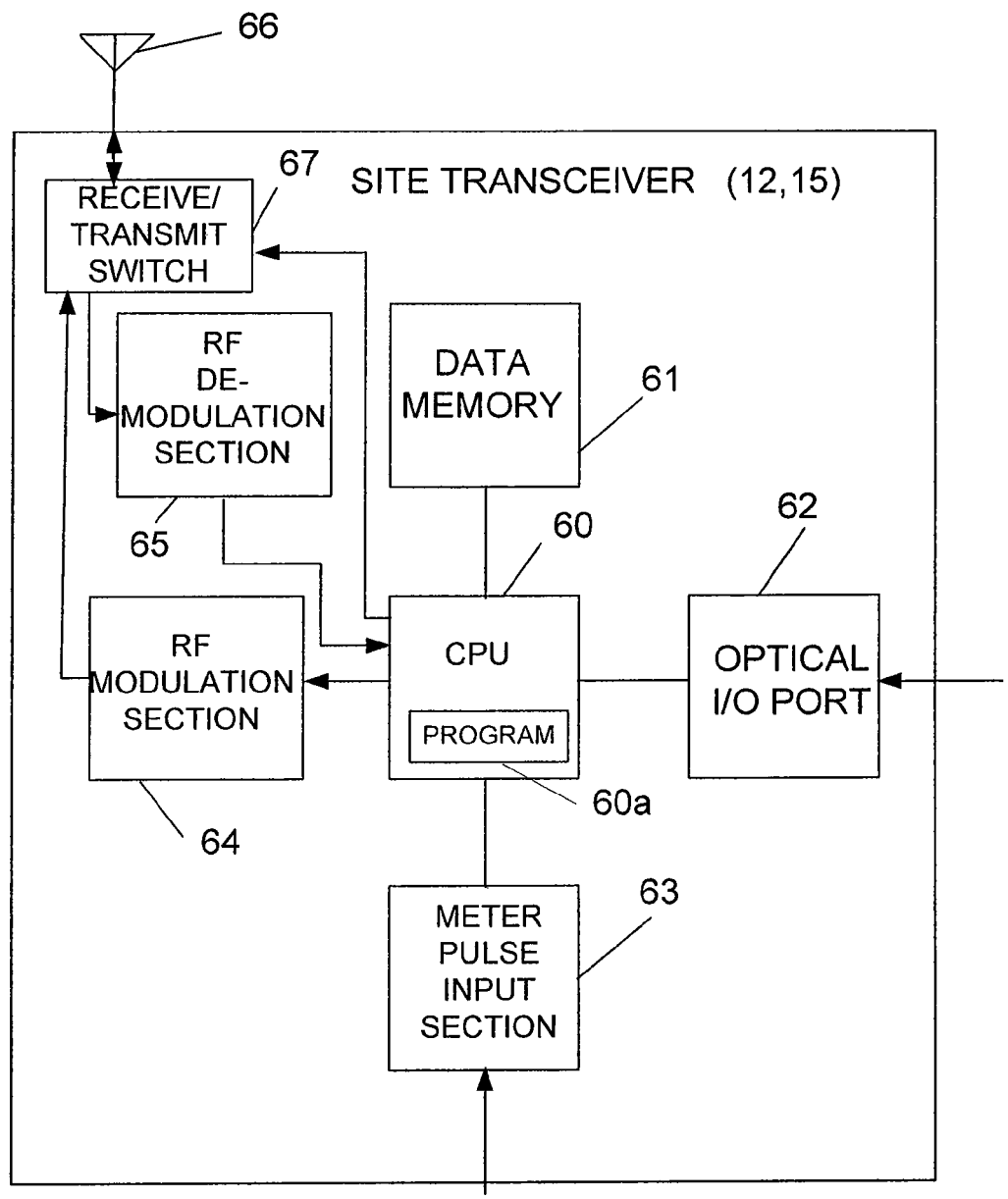
FIG. 2 is a block diagram of a metering data transceiver associated with a utility meter.

Referring to FIG. 2, the transceiver assembly 12, 15 more particularly includes an electrical circuit typically formed on a circuit board and including a microelectronic CPU 60 operating according to a control program of program instructions stored in an on-board program memory 60a. The program memory 60a is preferably nonvolatile, but it can be written to with a special programming unit, which communicates with the transceiver through an optical I/O port 62. The CPU 60 typically also utilizes an external data memory 61 for temporary storage of utility consumption data and other data.

As further seen in FIG. 2, the CPU 60 receives pulses through a meter pulse input section 63 from a pulse encoder (not shown) in a meter register. This input section can receive a pulse input or an input from an absolute digital encoder (ADE) circuit of a type known in the art. The CPU 60 then transmits metering data in a message protocol, which is modulated onto radio frequency (RF) carrier signals by an RF modulation section 64. The RF signals are transmitted through an antenna 66 to one of the network transceiver assemblies 20, 30, 40 in the fixed network (FIG. 1). Radio signals can also be received through the antenna 66 from the receivers or gateways 20, 30, 40 and these signals are demodulated by a demodulation section 65 to extract data from the RF carrier signals for processing by the CPU 60. This data can include commands and configuration data for operation of the site transceiver assembly 12, 15. A receive/transmit switch 67 is provided to connect the appropriate one of the sections 64, 65 to the antenna depending on whether the site transceiver is transmitting or receiving radio signals.

A transceiver 12, 15 at the utility meter data origination site will typically transmit data three times per day to a network receiver 20, 30, 40 in the fixed network. The transmission will be made through frequency hopping within a frequency range of from 902 MHz to 928 MHz. The network receiver 20, 30, 40 can respond with radio frequency signals carrying command information for adjusting the real time clock on the site transceiver 12, 15, adjusting the power level of transmissions from the site transceiver, adjusting the frequency of transmissions and requesting historical consumption data from the site transceiver 12, 15. The power level of transmission from the site transceiver 12, 15 is programmable and is applied to the antenna gain for the antenna 66 to determine the transmission power level.

Each site transceiver assembly 12, 15 is powered by one or more on-board batteries (not shown) as is well known in the art. In order to provide a longer battery life, communication between a site transceiver 12, 15 and the fixed network transceivers 20, 30, 40, is preferably initiated from the site transceiver 12, 15. The site transceivers 12, 15 are battery-powered while the network transceivers 20, 30, 40 are typically powered from an available AC source. As part of the network operation, site transceivers 12, 15 have individual serial numbers which are part of any communication to and from an assigned gateway 20, 30, 40. In order to conserve battery resources, the site transceivers 12, 15 each attempt to communicate with their assigned gateway 20, 30, 40 at scheduled times only a few times per day and at least once per day. Communications are initiated by the site transceivers 12, 15, and when utility consumption data has been transmitted, the gateway 20, 30, 40 can then respond (through a repeater 20, if necessary) with requests for additional data or the gateway 20, 30, 40 can send command and configuration data to the site transceivers 12, 15.

Figure 3:
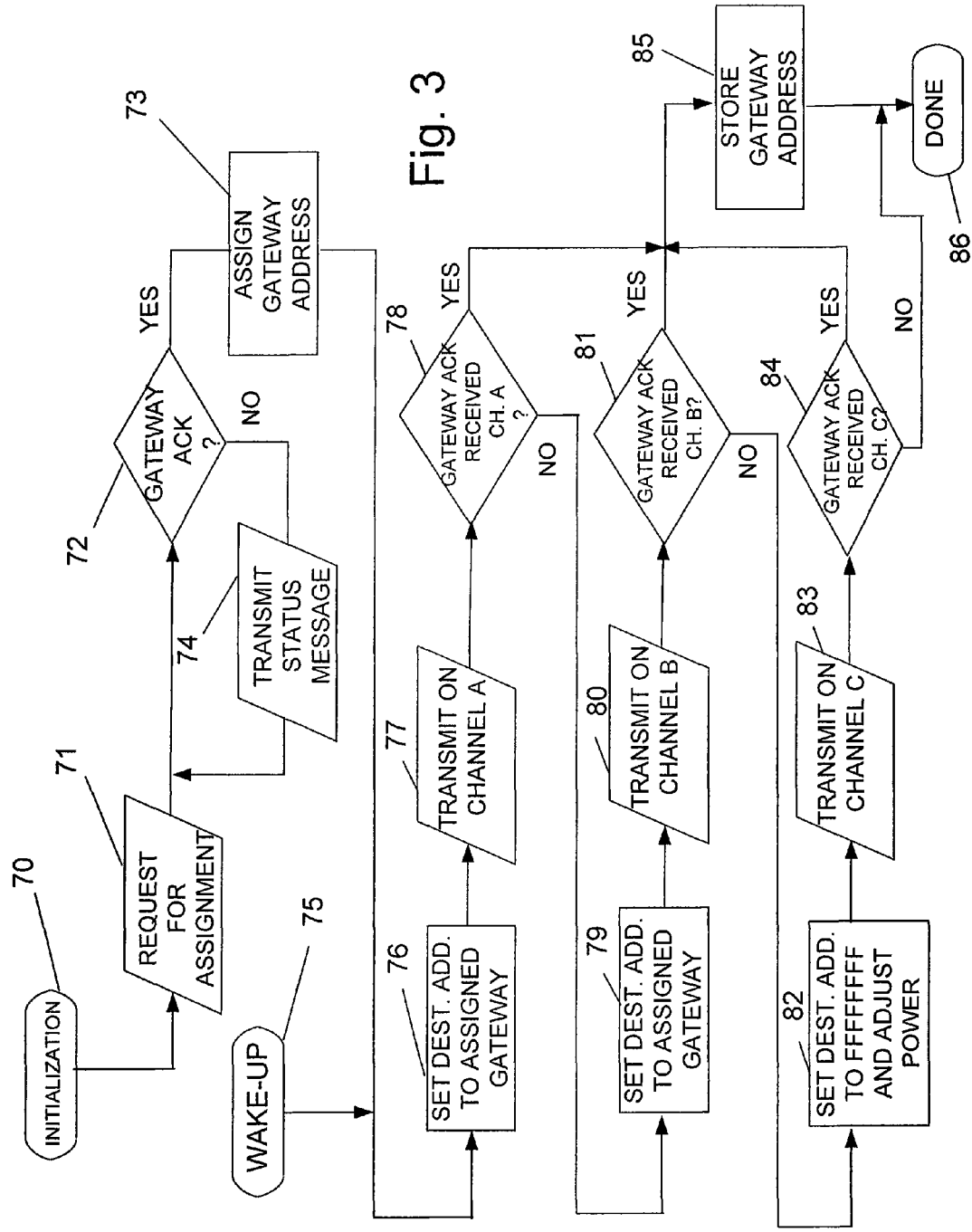
FIG. 3 is a flow chart of the programmed operation of the transceiver of FIG. 2 in the network of FIG. 1.

Referring to FIG. 3, a program routine is diagrammed that is executed by the CPU 60 in the site transceivers 12, 15 at the utility meter data origination sites. In this routine, the blocks represent groups of program instructions in a control program stored in the program memory 60a and executed by the CPU 60. As represented by start block 70, this represents a start of the routine. As represented by I/O block 71, at the initial startup of the transceiver, a request for assignment to a gateway is broadcast in a transmission. Next, a check is made, as represented by decision block 72, to determine whether a gateway has acknowledged the transmission, and if it has, information received in the acknowledgement will provide the transceiver with the address of the gateway to which it has been assigned, as represented by process block 73. If the result from executing decision block 72 is negative as represented by the "No" branch from decision block 72, then after a dormant period followed by a timed wake-up event, a status message is transmitted to the gateways within range, as represented by I/O block 74, and a check is made for an acknowledgement in decision block 72 until a gateway acknowledgement message is received.

Assuming that the site transceiver has been assigned to a gateway, it will enter a sleep mode and remain there, until it wakes up periodically, to communicate with the assigned gateway, as represented by start block 75. The site transceiver assemblies 12, 15 will transmit one of three messages containing varying amounts of meter data on one of three frequency hopping frequencies A, B or C, from among fifty such frequencies in the transmission frequency band. In an alternative embodiment utilizing lower power levels for communication, up to twenty-five frequency channels are utilized. The destination address in the message will be set to the assigned gateway address as represented by process block 76. The first transmission will be made on Channel A as represented by I/O block 77. The site transceiver assemblies 12, 15 will then listen for a gateway acknowledgement message or signal as represented by decision block 78 on the same frequency channel that it sent the information. At a minimum, this response from the gateway 20, 30, 40 comprises an updated system time that acts as an acknowledge signal that the message was received. If a gateway acknowledgement signal is not received as represented by the "No" result from decision block 78, then the CPU will next execute instructions represented by process block 79 to set the destination address to the gateway address (or retain the first gateway address set above). The transmission will be made on Channel B as represented by I/O block 80. The site transceiver assemblies 12, 15 will then listen for a gateway acknowledgement message or signal as represented by decision block 81.

If this acknowledgement signal is not received as represented by the "No" result from decision block 81, then the CPU will next execute instructions represented by process block 83 to set the destination address to a generic address "FFFFFFFF." The transmission will be made on Channel C as represented by I/O block 83. The site transceiver assemblies 12, 15 will then listen for a gateway acknowledgement message or signal as represented by decision block 84. If a gateway acknowledgement signal is received as a result of executing any of blocks 78, 81 or 84, the gateway address will be stored in memory in the site transceiver 12, 15, as represented by process block 85. The methodology discussed above allows the destination address to be changed when a gateway is replaced, or when another gateway can communicate with this endpoint more effectively. The routine then proceeds to the "Done" block 86.

If a site transceiver assembly 12, 15 receives the acknowledgement and transmits the requested information, when requested, then the sequence is completed. If the site transceiver assembly 12, 15 does not receive an acknowledgement it will attempt a transmission two additional times. These two additional retries will be made on different channel frequencies (B and C). The only difference in the message content is the destination address which is the address of the assigned gateway. The first two attempts will have the destination address that is the specific assigned gateway. The third attempt will include a global receiver address, such as "FFFFFFFF." Using different gateway addresses in the site messages to the gateways, allows the flexibility to save data destined for other gateways and also to re-assign transceivers to different gateways.

Although in this example, there are three tries with three messages, the invention can also be practiced in a system using a greater number of tries or a greater number of messages.

Figure 4:
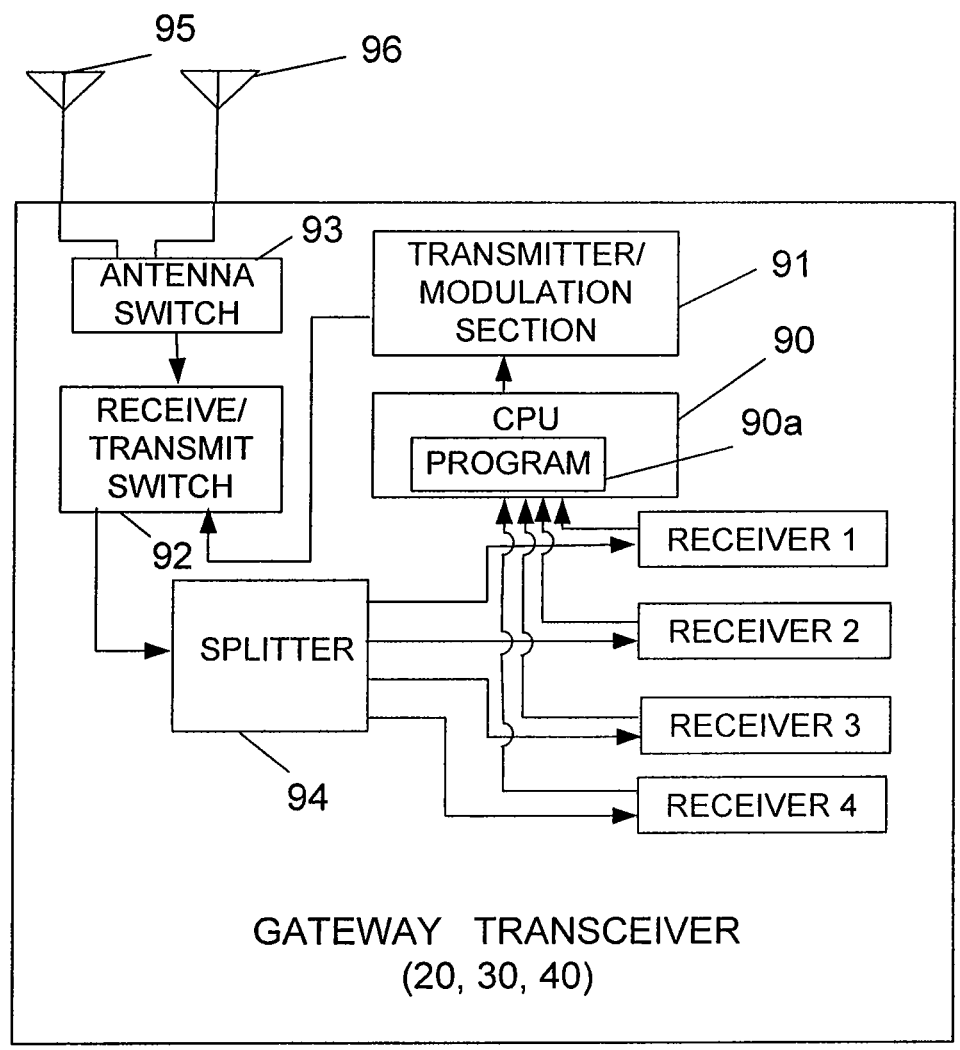
FIG. 4 is a block diagram of one of the gateways seen in FIG. 1.

Referring to FIG. 4, the gateway transceivers 20, 30, 40 more particularly includes an electrical circuit typically formed on a circuit board and including a microelectronic CPU 90 operating according to a control program stored in an on-board program memory 90a. The program memory 90a is preferably nonvolatile. The CPU 90 then transmits data in a message protocol in response to messages from the site transceivers, which initiate communication. Data to be transmitted from the gateway transceivers is modulated onto radio frequency (RF) carrier signals by an RF modulation section 91. The RF signals are transmitted through a receive/transmit switch 92, set to the transmit mode or position, and through an antenna switch 93, for selecting one of two antennas 95, 96. The transmissions are sent to the site transceiver assemblies 12, 15 (FIG. 1). Radio signals can also be received from the site transceiver assemblies through an antenna 95, 96, selected by the antenna switch 93, and the receive/transmit switch 92, when set to the receive mode or position. Receptions are directed through a splitter 94, which divided the reception spectrum of frequency channels into four groups, so that each receiver (RECEIVER 1-RECEIVER 4) only scans approximately one-quarter of the total number reception channels. The number of channels for spread spectrum operation within the 902-MHz to 928-MHz ISM frequency band ranges from twenty-five channels to fifty channels. (Gateway listens before transmitting.)

For this system with the four receivers (RECEIVER 1-RECEIVER 4) scanning fifty frequency hopping frequency channels to lock on to a message, this optimizes the circuit size, power consumption of the site transceivers and message processing time and reduces the size of the header in messages. This means that each receiver scans fewer channels and processes fewer messages than if a single receiver was used for all channels. It also limits the "on time" for each receiver. With four receivers, four messages on four different frequency channels can be processed concurrently. By concurrently, it is meant that messages are processed within a common time period with some overlap of processing activities, and not that the processing is completely simultaneous from start to finish.

Figure 5:
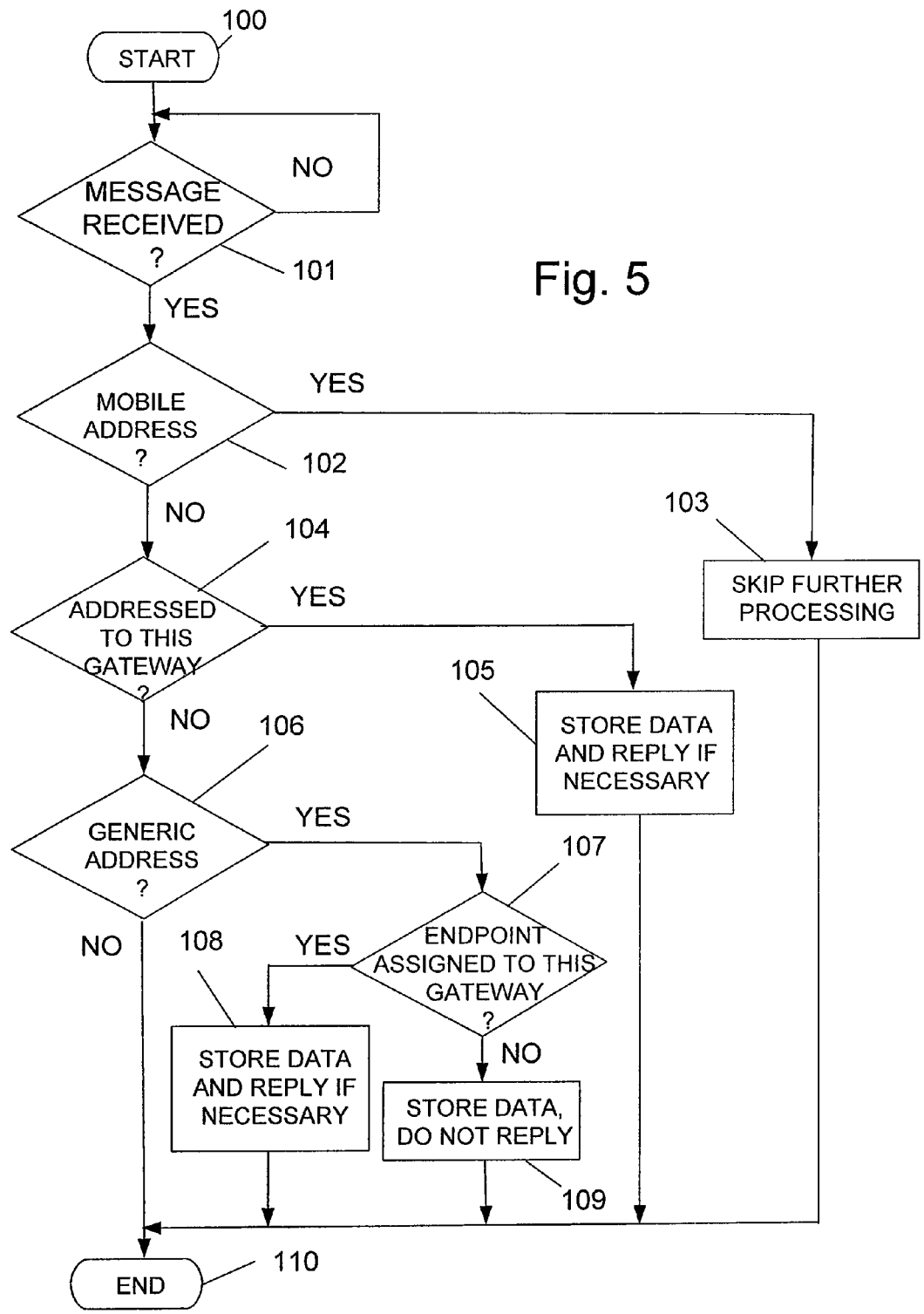
FIG. 5 is a flow chart of the programmed operation of the gateway transceiver of FIG. 4 in the network of FIG. 1.

Referring to FIG. 5, a program routine is diagrammed as executed in the transceivers at each of the gateways 20, 30, 40. In this routine, the blocks represent groups of program instructions in a control program stored in the program memory 90*a* and executed by a CPU 90 similar to those shown in FIG. 2, but located in the gateway 30. As represented by start block 100, this represents a start of the routine after a branching from a main task or thread of the control program. The CPU 90 executes one or more program instructions to simultaneously scan four of the fifty possible frequency channels to detect a transmission from a site transceiver, as represented by decision block 101. A system of prioritization is used to process communications being received. As represented by decision block 101, the gateway processor executes instructions to determine whether any message is received. If the answer is "Yes," as represented by the "Yes" result" branch from block 101, a check is made for any messages addressed to mobile receivers as represented by decision block 102. If the gateway address is that of a mobile gateway, as represented by the "Yes" result from decision block 102, there is no further processing of the message as represented by process block 103 and the routine is exited as represented by the end block 110, until the next message is detected. If the message is not addressed to a mobile receiver, as represented by the "No" result from decision block 102, the gateway address is next compared with the gateway address for gateway receiving the message as represented by decision block 104. If the answer is "Yes," as represented by the "Yes" result" branch from block 104, the CPU 90 executes instructions to store data and to prepare a reply message if necessary as represented by process block 105. The routine is exited as represented by the end block 110, until the next message is detected.

In the event that result of executing decision block 104 is "No," a check is made to see if the gateway address in the message from the site transceiver 12, 15 is the generic address "FFFFFFFF," as represented by decision block 106. If the answer is "No," the routine is exited as represented by the end block 110, until the next message is detected. If the answer is "Yes" from executing decision block 106, another check is made, as represented by decision block 107, to determine if the site transceiver 12, 15 had been assigned to this gateway, but had nevertheless made a transmission with the generic address. If the result is "Yes," the CPU 90 executes instructions to store metering data, including historical consumption data, and to prepare a reply message if necessary as represented by process block 108. If the result is "No," the CPU 90 executes instructions to store the data from the message to record that the message was received, but no reply message is prepared as represented by process block 109. The routine is exited as represented by the end block 110, until the next message is detected.

This description has showed how messages are given a priority by the fixed network receiver to conserve power, and yet to handle different situations in the communication of metering data from site transmitters to gateways in a fixed network meter data collection system. The description has also shown how the gateway receivers uses for receiving circuits to handle four messages concurrently in scanning the channels in a frequency hopping spread spectrum mode of communication.

This has been a description of the preferred embodiment, but it will be apparent to those of ordinary skill in the art that variations may be made in the details of these specific embodiments without departing from the scope and spirit of the present invention, and that such variations are intended to be encompassed by the following claims.

We claim:

1. A method of communications between a gateway transceiver in a fixed network and a plurality of site transceivers associated with respective meter reading devices, the method comprising:

receiving an incoming message from one of the site transceivers at a gateway fixed transceiver, including meter reading data from a meter reading device associated with the site transceiver, and then first, checking the message for a first gateway address of a mobile gateway; and upon not detecting the first gateway address, then checking the message for a second gateway address of a gateway to which the site transceiver associated with the meter reading device is assigned; and upon not detecting the second gateway address, then, checking the message for a global gateway address; and upon detecting the first gateway address for a mobile gateway, the gateway fixed transceiver skips further processing of the incoming message;

upon detecting the second gateway address from a site transceiver associated with the meter reading device indicating that the meter reading device is assigned to this gateway, the meter reading data in the message is stored in memory and a reply message is transmitted if necessary to the site transceiver associated with the meter reading device; and upon detecting a global gateway address, a further check is made to determine if the site transceiver associated with the meter reading device is assigned to this gateway, and if so assigned, the meter reading data in the message is stored in memory and a reply message is transmitted, if necessary, to the site transceiver associated with the meter reading device, and if not so assigned, then data in the message is stored in memory to record that the message was received, but a reply message is not transmitted.

2. The method of claim 1, further comprising:

the plurality of site transceivers transmitting on various ones of at least twenty-five frequency channels;

receiving and processing messages through four receiver circuits in the gateway receiver, and receiving incoming transmissions with four receiver circuits operating in parallel to reduce processing time for messages received on a plurality of frequency channels up to and including twenty-five channels.

3. The method of claim 1, wherein the plurality of frequency channels is extended up to and including fifty frequency channels.

4. The method of claim 1, wherein the gateway fixed receiver communicates with a control center through a backhaul network.

5. The method of claim 4, wherein the backhaul network is a network operating according to at least one of the following protocols: WiFi-Internet; Power-over-Ethernet to the Internet; or a cellular network protocol.

6. A gateway transceiver for use in a fixed automatic meter reading network, the gateway transceiver comprising:

a gateway transceiver circuit including means for receiving an incoming message from a site transceiver at a gateway fixed transceiver, including meter reading data from a meter reading device associated with the site transceiver, and the gateway transceiver circuit being programmed to execute a program of instructions, including instructions for each of the following operations:

checking the message for a first gateway address of a mobile gateway; and upon not detecting the first gateway address, then checking the message for a second gateway address of a gateway to which the site transceiver associated with the meter reading device is assigned; and upon not detecting the second gateway address, then checking the message for a global gateway address; and whereupon detecting the first gateway address for a mobile gateway, the gateway transceiver circuit skips further processing of the incoming message;

whereupon detecting the second gateway address from a meter reading device indicating that the meter reading device is assigned to this gateway, and if so, the meter reading data in the message is stored in memory and a reply message is transmitted if necessary to a site transceiver associated with the meter reading device; and whereupon detecting a global gateway address, a further check is made to determine if the that the meter reading device that transmitted the message is assigned to this gateway, and if so assigned, the meter reading data in the message is stored in memory and a reply message is transmitted if necessary to a site transceiver associated with the meter reading device, and if not so assigned, then data in the message is stored in memory to record that the message was received, but a reply message is not transmitted.

7. The gateway transceiver of claim 6, further comprising at least four receiver circuits for receiving incoming transmissions and operating in parallel to reduce processing time for messages received on a plurality of frequency channels up to and including twenty-five frequency channels, and a splitter for routing messages on four frequency channels to the four respective receiver circuits.

8. The gateway transceiver circuit of claim 7, wherein the plurality of frequency channels extends up to and including fifty.

* * * * *